(12) United States Patent
Ou et al.

(10) Patent No.: US 7,553,542 B2
(45) Date of Patent: Jun. 30, 2009

(54) FUNCTIONALIZED MAGNETIZABLE MICROSPHERES AND PREPARATION THEREOF

(75) Inventors: Jinn-Luh Ou, Taipei (TW); Yuh Sung, Taoyuan (TW); Chang-Ping Chang, Taoyuan (TW); Ming-Der Ger, Taoyuan (TW); Szu-Ching Hsiao, Taoyuan (TW); Yan-Cheng Chen, Taoyuan (TW)

(73) Assignee: National Defense University, Taoyuan (TW)

( * ) Notice: Subject to any disclaimer, the term of this patent is extended or adjusted under 35 U.S.C. 154(b) by 0 days.

(21) Appl. No.: 11/889,375

(22) Filed: Aug. 13, 2007

(65) Prior Publication Data

US 2008/0081193 A1    Apr. 3, 2008

(30) Foreign Application Priority Data

Oct. 2, 2006    (TW) ............................. 95136618 A

(51) Int. Cl.
*B32B 5/66* (2006.01)
(52) U.S. Cl. .................. 428/403; 428/404; 428/405; 428/406; 428/407; 427/212

(58) Field of Classification Search ......... 428/403–407; 427/212

See application file for complete search history.

(56) References Cited

U.S. PATENT DOCUMENTS 5,356,713 A * 10/1994 Charmot et al. ............. 428/407
5,976,426 A * 11/1999 Richard et al. ............... 264/4.7

\* cited by examiner

*Primary Examiner*—Leszek Kiliman
(74) *Attorney, Agent, or Firm*—Bacon & Thomas, PLLC

(57) ABSTRACT

The present invention discloses a two-stage process for preparing functionalized magnetizable microspheres. The first stage includes forming an inner shell of styrene polymer or styrene copolymer around magnetizable nano particles having a monolayer of a non-water-soluble dispersing agent coated thereon. The second stage includes forming an outer shell of styrene polymer or styrene copolymer with sulfate ($SO_4^-$) bounded thereto around the inner shell by free radical polymerization. Preferably, nano particles of a noble metal are deposited on the surface of the outer shell. The magnetizable microspheres prepared by the process of the present invention have a size of 100-1000 nm, and the thickness ratio of the inner shell to the outer shell ranges from 10:1 to 1:10.

20 Claims, 3 Drawing Sheets

US 7,553,542 B2

FUNCTIONALIZED MAGNETIZABLE MICROSPHERES AND PREPARATION THEREOF

FIELD OF THE INVENTION

The invention relates to a functionalized magnetizable microsphere and a two-stage preparation method thereof; the magnetizable microsphere may be applied for biological purposes.

BACKGROUND OF THE INVENTION

A magnetizable composite microsphere having a particle size that ranges from 0.05 to 10 μm is disclosed in U.S. Pat. No. 5,356,713, which has magnetizable nano particles coated with a monolayer of a non-water-soluble dispersing agent at its core, and an outer shell made of cross-linked polymers that enclosed around the magnetizable nano particles. A preparation method thereof is also disclosed, which includes dispersing magnetizable nano particles in a mixture containing ethylene-aromatic monomers, emulsified ethylenically unsaturated monomers, and a dispersing agent added selectively; subsequently adding and allowing an initiator to disperse in the mixture, and finally co-polymerizing the monomers. However, there are still more than 10% of blank microspheres that do not contain magnetizable materials present in the magnetizable microspheres prepared by this method, and the blank microspheres must be separated from the magnetizable microsphere product in a magnetic field. In addition, the magnetizable microspheres prepared by this method have poor monodispersity in particle size. The resulting magnetizable microspheres or aqueous dispersion thereof may be used for immobilizing biologically active substances via adsorption or covalent bonding; such as proteins (antibodies and enzymes), antigens, and medical products. The resulting products may be optimally applied for biological diagnosis and analysis according to the nature of the biologically active substances, such as agglutination assay, radioimmunoassay (RIA), immunoradiometric assay (IRMA), enzyme immunoassay (EIA), and affinity chromatography; or applied as an enzymatic catalyst for biotechnological purposes, and as a carrier for cell cultivation. The disclosure of this U.S. patent is incorporated herein by reference. A magnetizable microsphere that has uniform monodispersity and a particle size that ranges from 0.1 to 5 μm is disclosed in U.S. Pat. No. 5,976,426, which is comprised of a lipophilic polymer matrix and a magnetizable filling. But the magnetizable filling is partially exposed at outside of the lipophilic polymer matrix in the magnetizable microsphere, which limits the application of this magnetizable microsphere for biomedical purposes. The disclosure of this U.S. patent is incorporated herein by reference.

SUMMARY OF THE INVENTION

A primary objective of the invention is to propose a functionalized magnetizable microsphere having magnetizable nano particles at core thereof and an outer shell of styrene polymer or styrene copolymer with sulfate ($SO_4^-$) bounded thereto. Another objective of the invention is to propose a magnetizable microsphere with nano particles of a noble metal bounded thereon, which has magnetizable nano particles at core thereof and an outer shell of styrene polymer or styrene copolymer with nano particles of a noble metal deposited thereon.

A further objective of the invention is to propose a method for preparing a functionalized magnetizable microsphere.

The method for preparing the functionalized magnetizable microsphere of the present invention is a two-stage process. In the first stage, an inner shell of styrene polymer or styrene copolymer is formed around magnetizable nano particles having a monolayer of a non-water-soluble dispersing agent coated thereon via suspension polymerization. In the second stage, an outer shell of styrene polymer, styrene copolymer or poly(methacrylic acid) with sulfate ($SO_4^-$) bounded thereto is formed around the inner shell via free radical polymerization by using a persulfate initiator. The resultant magnetizable microspheres have a size of 100-1000 nm and a thickness ratio of the inner shell to the outer shell ranging from 10:1 to 1:10.

Currently, surfactants are often required for the preparation of magnetizable microspheres, which means the surfactants must be removed before the magnetizable microspheres may be applied for biomedical purposes. But in the method disclosed in this invention, a first layer of polymer is formed around the magnetizable nano particles, then followed by forming a second layer of polymer around the first layer of polymer in the absence of a surfactant, which effectively eliminates the need to remove surfactants, and imparts reactive sulfate groups to the surface of the magnetizable microspheres. The sulfate groups not only stabilize the magnetizable microspheres, but also reduce ions of a noble metal, so that the noble metal in elemental form thereof can be deposited onto the surface of the magnetizable microspheres. As a result, the resulted magnetizable microspheres may be applied for further biomedical purposes.

BRIEF DESCRIPTION OF THE DRAWINGS

The structure and the technical means adopted by the present invention to achieve the above and other objectives can be best understood by referring to the following detailed description of the preferred embodiments and the accompanying diagrams, wherein.

DETAILED DESCRIPTION OF THE INVENTION

Figure 1:
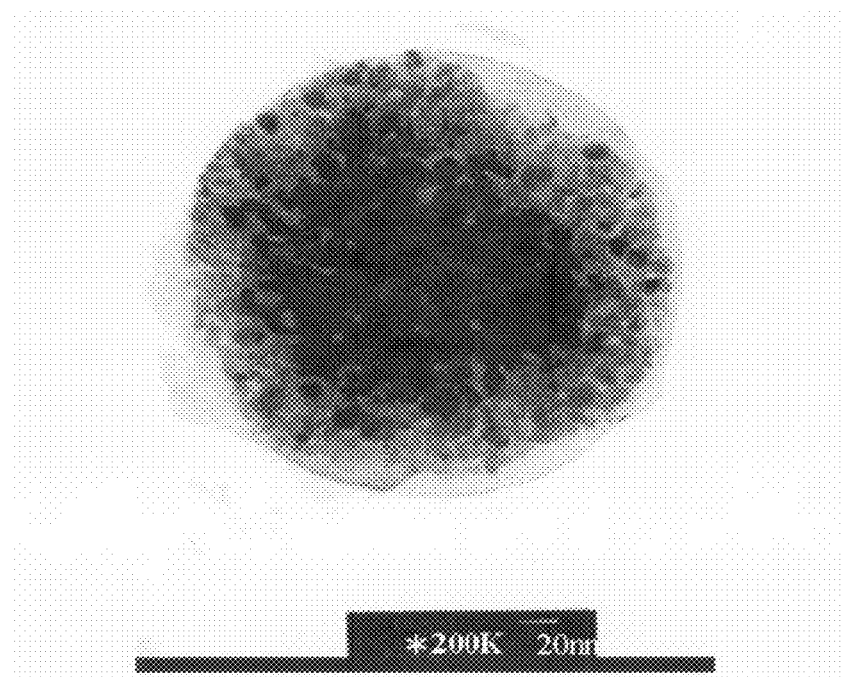
FIG. 1 shows a photograph of a composite microsphere of $Fe_3O_4$ particles coated with styrene polymer prepared in Example 1 of the present invention, as revealed by transmission electron microscopy (TEM).

The present invention provides a functionalized magnetizable microsphere, comprising magnetizable nano particles of a particle size ranging between 1-30 nm, the magnetizable nano particles having a monolayer of a non-water-soluble dispersing agent coated thereon; an inner shell of styrene polymer or styrene copolymer enclosing around the magnetizable nano particles, and an outer shell of styrene polymer with sulfate ($SO_4^-$) bounded thereto, styrene copolymer with sulfate ($SO_4^-$) bounded thereto or ply(methacrylic acid) with sulfate ($SO_4^-$) bounded thereto enclosing around the inner shell, wherein the magnetizable microspheres have a size of 100-1000 nm and a thickness ratio of the inner shell to the outer shell ranging from 10:1 to 1:10.

The present invention also provides a method for preparing the functionalized magnetizable microsphere, comprising the following steps:
  a) in a mixture of magnetizable nano particles with a particle size between 1-30 nm and having a monolayer of a non-water-soluble dispersing agent coated thereon, water, styrene monomers, a first ethylenically unsaturated monomer added selectively, a free radical initiator, and a surfactant; suspension polymerizing the styrene monomers and the first ethylenically unsaturated monomers if exist under stirring, so that an inner shell of styrene polymer or styrene copolymer is formed around the magnetizable nano particles; and
  b) mixing the resultant emulsion from step a) with a persulfate initiator, and methacrylic acid monomers or styrene monomers or styrene monomers together with a second ethylenically unsaturated monomer, and carrying out a free radical polymerization of the monomers to form an outer shell of poly(methacrylic acid), styrene polymer or styrene copolymer around the inner shell with sulfate ($SO_4^-$) bounded to the outer shell, so that functionalized magnetizable microspheres are formed.

Preferably, the magnetizable microsphere of the present invention further comprises nano particles of a noble metal deposited on a surface of the outer shell.

Preferably, the magnetizable nano particles are magnetite or haematite, and more preferably, magnetite.

Preferably, the non-water-soluble dispersing agent is an aliphatic acid or an aliphatic amine having 12-24 carbon atoms.

Preferably, the inner shell and the outer shell are styrene polymer. More preferably, the styrene polymer have a number average molecular weight between 1000-1000000.

Preferably, the noble metal is selected from the group consisting of gold (Au), silver (Ag), palladium (Pd), platinum (Pt), and ruthenium (Ru). More preferably, the noble metal is gold (Au).

Preferably, the persulfate initiator is an alkali metal persulfate, for example potassium persulfate.

Preferably, the method of the present invention further comprises a step in which the functionalized magnetizable microspheres obtained from step b) are allowed to contact with an aqueous solution that contains ions of a noble metal, reducing the ions of the noble metal to elemental form thereof, so that the noble metal is deposited onto the surface of the outer shell. More preferably, the contact is carried out at a temperature ranging between 50-95° C.

Preferably, the aqueous solution containing ions of the noble metal is an aqueous solution that contains ions of gold (Au), silver (Ag), palladium (Pd), platinum (Pt), and ruthenium (Ru), and more preferably, gold.

Preferably, the first ethylenically unsaturated monomer is not used in step a). More preferably, the styrene polymer obtained in step a) has a number average molecular weight between 1000-1000000.

Preferably, the second ethylenically unsaturated monomer is not used in step b). More preferably, the styrene polymer obtained in step b) has a number average molecular weight between 1000-1000000.

Preferably, the first ethylenically unsaturated monomer and the second ethylenically unsaturated monomer independently are acrylic acid, methacrylic acid, methyl acrylate, or methyl methacrylate.

In one of the preferred embodiments for preparing functionalized magnetizable microspheres according to the present invention, $Fe_3O_4$ particles with an average particle size of 8 nm and having non-water-soluble functional groups on surfaces thereof were used as magnetizable nano particles, and styrene monomers were used as a raw material of a polymeric coating. In the first stage of the preparation, $Fe_3O_4$ particles were firstly mixed with styrene monomers wherein a free radical initiator was dissolved therein in advance; on the other hand, a surfactant was dissolved in an adequate amount of water, and the resulting oil phase and water-phase were mixed together by using a homogenizer at low temperature such as in an ice bath, and subsequently gave rise to a suspension; the suspension was allowed to undergo suspension polymerization under stirring at a higher temperature, so as to form an inner shell of styrene polymer around the magnetizable nano particles. The resultant intermediate magnetizable microspheres have a particle size of approximately 100-500 nm, and have a uniform monodispersity in particle size. As revealed from the analysis of high-resolution TEM (transmission electron microscopy), the magnetizable nano particles are completely coated by styrene polymer, while the magnetizable nano particles are still dispersed in the macromolecule.

The magnetizable nano particles used in the invention may be the magnetizable nano particles disclosed in the aforesaid U.S. Pat. Nos. 5,356,713 and 5,976,426.

An important basis for deciding which free radical initiators may be used in the first stage is that the free radical initiator must be dissolvable in the monomer, such as the azonitriles and peroxides disclosed in the aforesaid U.S. Pat. No. 5,356,713, which takes up 1-10 wt % of the monomers in the overall mixture. The surfactant used in the invention may be selected from anionic surfactants, cationic surfactants, and non-ionic surfactants; the proportion of the surfactant in the overall mixture is 0.1-5 wt % of the magnetizable nano particles, and the preferable surfactant is the anionic surfactants, such as the salts of fatty acids, alkali metal alkyl sulfate, and alkyl sulfonates.

In the second stage of preparation, the emulsion resulting from the polymerization in the first stage of preparation was mixed with an aqueous solution with a persulfate initiator dissolved therein at low temperature such as in an ice bath, followed by adding styrene monomers, which was then subjected to a free radical polymerization under stirring at a higher temperature, so that an outer shell of styrene polymer was formed around the inner shell. The product of functionalized magnetizable microspheres may be separated from the reaction mixture via simple filtration later. Because the persulfate initiator is used in the second stage of preparation in the invention, the outer shell of styrene polymer is bounded with sulfate groups ($SO_4^-$), and the outer shell of styrene polymer has a thickness of approximately 100-500 nm. Since the surfactant is not used in the second stage of preparation, and the surfactant originally presents on the surface of the intermediate product are stacked below the polymer resulted from the free radical polymerization in the second stage of the preparation; when such polymer grow to a certain thickness, the surfactant will be buried in the outer shell of styrene polymer due to the entanglement of polystyrene molecular chains. As a result, the resultant functionalized magnetizable microspheres do not possess a surfactant thereon, but the sulfate groups at the terminals of polystyrene chains instead. The functionalized magnetizable microspheres are stably dispersed in water due to the charge repulsion of the sulfate groups. As revealed from the analysis of high-resolution TEM, the outer shell of styrene polymer has a uniform thickness, thus the final product of functionalized magnetizable microspheres still have a uniform monodispersity in particle size. The functionalized magnetizable microspheres may further react with ions of a noble metal in order to undergo a deposition of nano metal particles, so that nano particles of a noble metal may be deposited onto the surfaces of the functionalized magnetizable microspheres, thereby further enhancing the functions of the functionalized magnetizable microspheres.

EXAMPLE 1

Dissolved BPO (benzoyl peroxide) initiator that weighed 1.28% of the weight of styrene monomer into the styrene monomer, then added $Fe_3O_4$ particles with an average particle size of 8 nm and having non-water-soluble functional groups coated thereon (purchased from Taiwan Advance Nanotech, Inc.; product number USPIO-202) into the aforesaid solution, and mixed the resulting mixture with an aqueous solution of SDS (sodium dodecyl sulfate) at high speed (1200 rpm) by using a high-speed homogenizer in an ice bath for 20 minutes. The usage amount of styrene monomer and $Fe_3O_4$ particles are listed in Table 1. The aqueous SDS solution contained 54 ml of deionized water and SDS that weighed 1.28% of the weight of the deionized water. The resultant suspension was then poured into a 250-ml flask to undergo polymerization under stirring at 200 rpm and at a 75° C. water bath; the reaction time was 8 hours.

As shown in FIG. 1, the $Fe_3O_4$ particles are completely enclosed by styrene polymer, and the $Fe_3O_4$ particles are still loosely distributed within the styrene polymer. Moreover, the $Fe_3O_4$ particles do not form a nucleus-shell structure within the enclosure of styrene polymer, which indicates that the magnetizable nano particles are highly compatible with the oil phase, and this presents a favorable condition for preparing magnetizable composite microspheres of various particle sizes.

Table 1 shows the outcome of using different amount of $Fe_3O_4$ particles for making composite microspheres. The figures of Table 1 indicate that the average particle size (D) of composite microspheres made from $Fe_3O_4$ particles enclosed in styrene polymer increases as the usage amount of $Fe_3O_4$ particles is proportionally increased. Furthermore, results obtained from a particle size analyzer (Zeta Plus, BIC) indicate that the composite microspheres have a uniform monodispersity in particle size.

TABLE 1

| $Fe_3O_4$ particles (mg) | Styrene (ml) | BPO (M) | D (nm) |
|---|---|---|---|
| 50 | 6 | $3.17 \times 10^{-4}$ | 140 |
| 100 | | | 169 |
| 200 | | | 211 |
| 300 | | | 216 |
| 400 | | | 301 |
| 500 | | | 344 |

EXAMPLE 2

The procedures in Example 1 were repeated here, but the amount of SDS was changed from 1.28 wt % to 0.32 wt %, based on the weight of deionized water used; and the results are listed in Table 2.

The data shown in Table 1 and Table 2 indicate that, as the concentration of the surfactant is decreased, the average particle size (D) of the composite microspheres made from $Fe_3O_4$ particles coated with styrene polymer is increased.

TABLE 2

| $Fe_3O_4$ particles (mg) | Styrene (ml) | BPO (M) | D (nm) |
|---|---|---|---|
| 100 | 6 | $3.17 \times 10^{-4}$ | 375 |
| 200 | | | 421 |
| 300 | | | 432 |
| 400 | | | 449 |

EXAMPLE 3

Extracted 17 ml and 54 ml from the emulsion prepared in Example 1 (containing composite microspheres made from $Fe_3O_4$ particles enclosed in styrene polymer) in which the amount of $Fe_3O_4$ particles used was 100 mg, then added an aqueous solution of potassium persulfate (KPS) that served as a water-phase initiator into the two solutions, respectively; the resulting two mixtures were sonicated for 30 minutes in an ice bath subsequently. The aqueous KPS solution contained 54 ml of deionized water and a KPS concentration of $3.4 \times 10^{-3}$ M. The resulting two mixtures after be sonicated were then added with 6 ml of styrene monomer and allowed to react for 24 hours at a 75° C. water bath. After subjecting the solutions to filtration, a final product of magnetizable microspheres was obtained and washed with deionized water. The usage amount of the emulsion of the composite microspheres, and the average particle size of the final magnetizable microspheres resulted accordingly are listed in Table 3.

TABLE 3

| | Emulsion of the composite microspheres (ml) | |
|---|---|---|
| | 17 | 54 |
| Average particle size of the final magnetizable microspheres (nm) | 154 | 200 |

Figure 2:
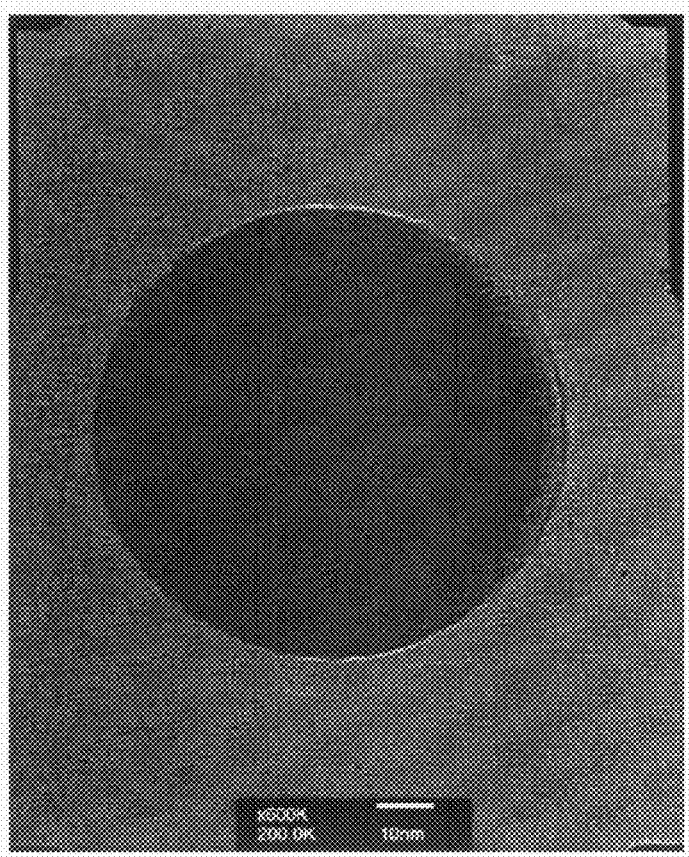
FIG. 2 shows a photograph of a final product of a magnetizable microsphere prepared in Example 3 of the present invention, as revealed by TEM.

From the TEM photograph shown in FIG. 2, it can be seen that the final magnetizable microspheres obtained by using 17 ml of the emulsion in this example have a lightly grey outer shell that is approximately 5-10 nm thick.

EXAMPLE 4

Figure 3:
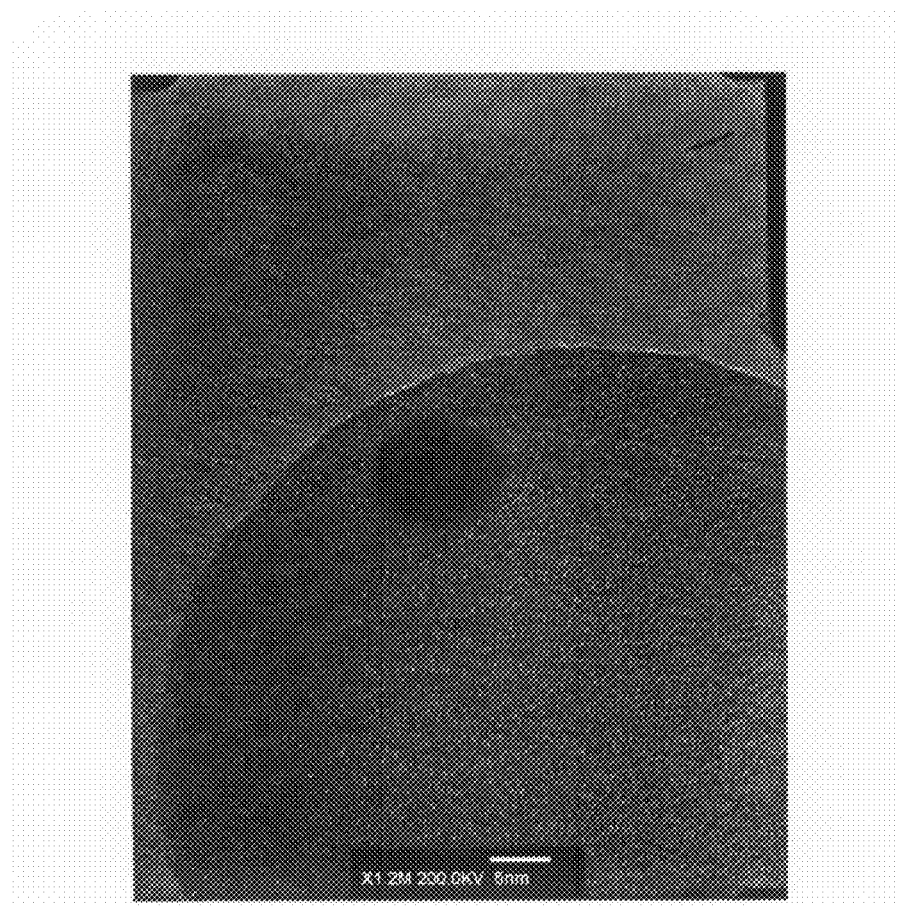
FIG. 3 shows a photograph of a magnetizable microsphere with gold nano particles deposited thereon as revealed by TEM, prepared in Example 4 of the invention.

Extracted 20 ml of the final magnetizable microspheres (with a particle size of 154 nm) prepared in Example 3, and immersed the magnetizable microspheres in 20 ml of $HAuCl_4$ (gold hydrogen tetrachlorourate) aqueous solution with a concentration of 600 ppm, then heated the mixture to 80° C. and allowed to react for 10 minutes. The reaction product was then obtained by filtration and washed with deionized water. From the TEM photograph shown in FIG. 3, it can be observed that gold nano particles are deposited on the surface of the magnetizable microsphere.

EXAMPLE 5

Figure 4:
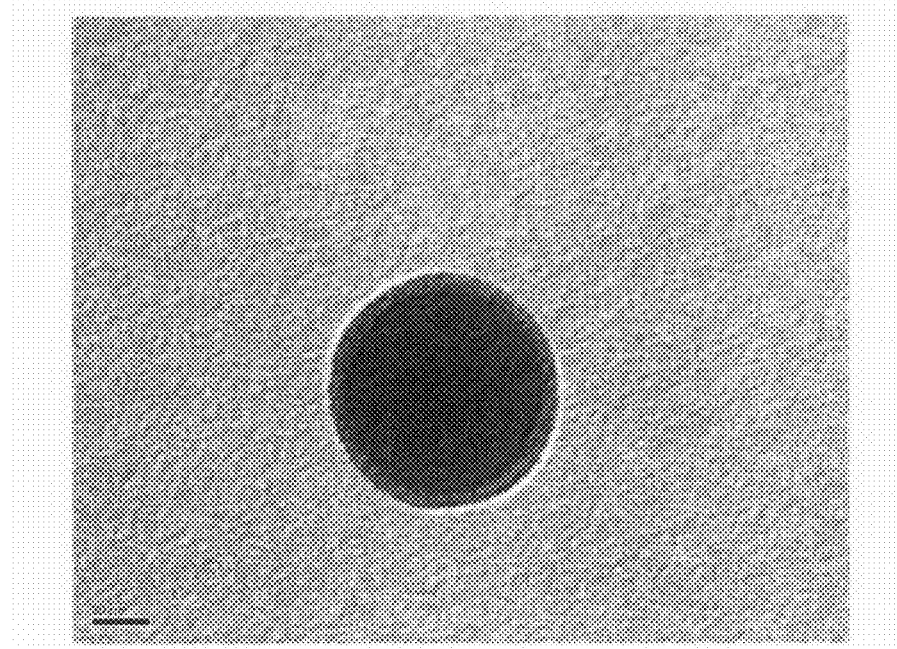
FIG. 4 shows a photograph of a final product of a magnetizable microsphere prepared in Example 5 of the present invention, as revealed by TEM.

To 60 ml of an emulsion prepared by a process similar to Example 1 (containing composite microspheres made from $Fe_3O_4$ particles enclosed in styrene polymer), an aqueous solution of potassium persulfate (KPS) that served as a water-phase initiator was added; the resulting mixture was sonicated for 30 minutes in an ice bath subsequently. The aqueous KPS solution contained 54 ml of deionized water and a KPS concentration of $3.4 \times 10^{-3}$ M. The resulting mixture after be sonicated was then added with 1 ml of methacrylic acid monomer and allowed to react for 24 hours at a 75° C. water bath. After subjecting the solutions to filtration, a final product of magnetizable microspheres was obtained and washed with deionized water, as shown in FIG. 4.

Figure 5:
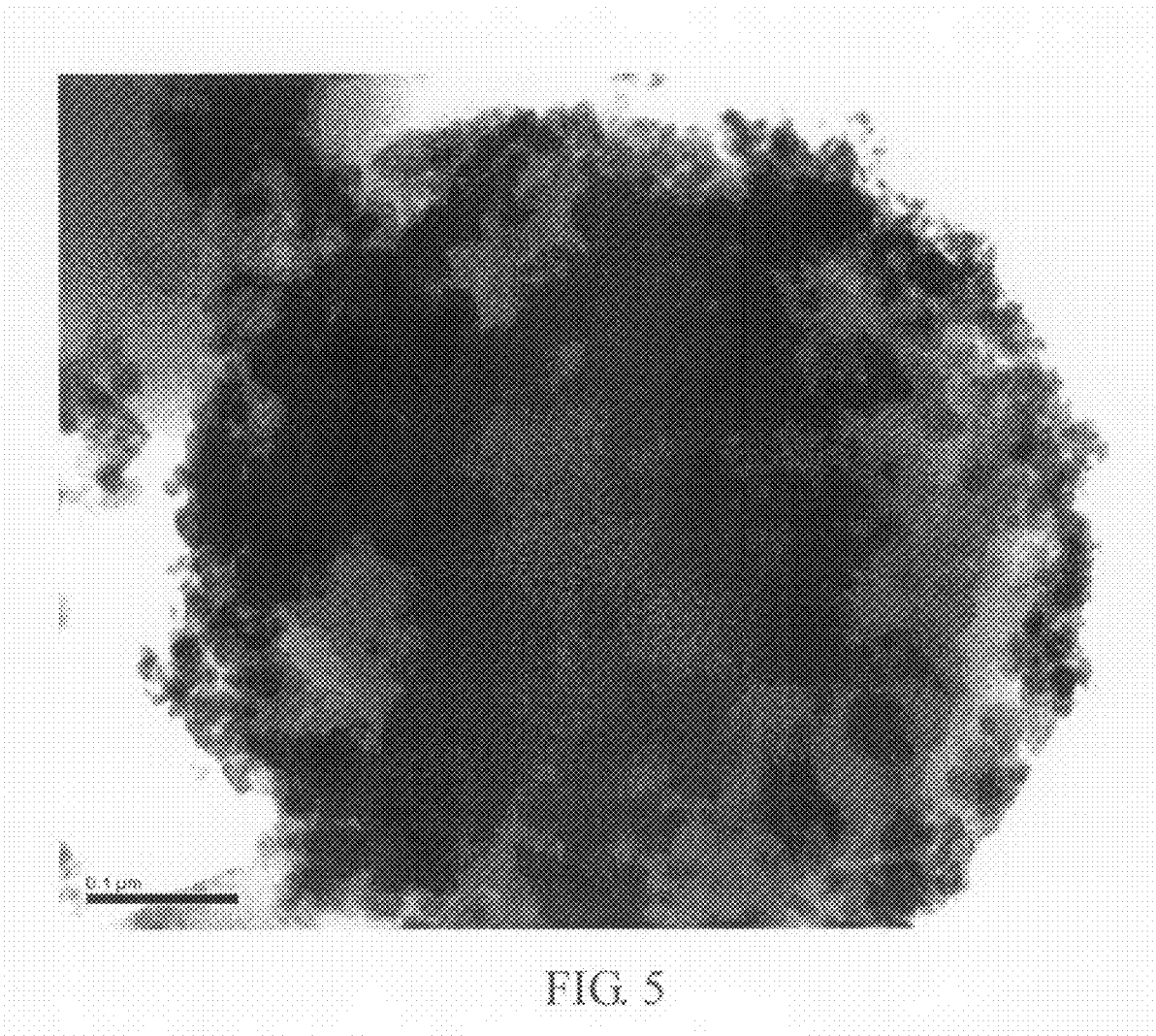
FIG. 5 shows a photograph of a magnetizable microsphere with gold nano particles deposited thereon as revealed by TEM, prepared in Example 5 of the invention.

Extracted 20 ml of the final magnetizable microspheres, and immersed the magnetizable microspheres in 20 ml of $HAuCl_4$ aqueous solution with a concentration of 600 ppm, then heated the mixture to 80° C. and allowed to react for 10 minutes. The reaction product was then obtained by filtration and washed with deionized water. From the TEM photograph shown in FIG. 5, it can be observed that gold nano particles are deposited on the surface of the magnetizable microsphere.

Although several preferred embodiments of the invention has been described for purposes of illustration, it is understood that various changes and modifications to the described embodiment can be carried out without departing from the scope and the spirit of the invention as disclosed in the appended claims.

What is claimed is:

1. A functionalized magnetizable composite microsphere, comprising a core of magnetizable nano particles of a particle size ranging between 1-30 nm, the magnetizable nano particle having a monolayer of a non-water-soluble dispersing agent coated thereon; an inner shell of styrene polymer or styrene copolymer enclosing around the core magnetizable nano particle, and an outer shell of styrene polymer with sulfate ($SO_4$) bounded thereto, styrene copolymer with sulfate ($SO_4$) bounded thereto or ply(methacrylic acid) with sulfate ($SO_4$) bounded thereto enclosing around the inner shell, wherein the magnetizable microsphere have a size of 100-1000 nm and a thickness ratio of the inner shell to the outer shell ranging from 10:1 to 1:10.

2. The magnetizable microsphere of claim 1, further comprising nano particles of a noble metal deposited on a surface of the outer shell.

3. The magnetizable microsphere of claim 1, wherein the magnetizable nano particles are magnetite or haematite.

4. The magnetizable microsphere of claim 1, wherein the non-water-soluble dispersing agent is an aliphatic acid or an aliphatic amine having 12-24 carbon atoms.

5. The magnetizable microsphere of claim 1, wherein the inner shell and the outer shell are styrene polymer.

6. The magnetizable microsphere of claim 5, wherein the styrene polymer have a number average molecular weight between 1000-1000000.

7. The magnetizable microsphere of claim 2, wherein the noble metal is selected from the group consisting of gold (Au), silver (Ag), palladium (Pd), platinum (Pt), and ruthenium (Ru).

8. The magnetizable microsphere of claim 7, wherein the noble metal is gold (Au).

9. A method for preparing the functionalized magnetizable microsphere of claim 1, comprising the following steps:

a) in a mixture of magnetizable nano particles with a particle size between 1-30 nm and having a monolayer of a non-water-soluble dispersing agent coated thereon, water, styrene monomers, a first ethylenically unsaturated monomer added selectively, a free radical initiator, and a surfactant;

suspension polymerizing the styrene monomers and the first ethylenically unsaturated monomers if exist under stirring, so that an inner shell of styrene polymer or styrene copolymer is formed around the magnetizable nano particles; and b) mixing the resultant emulsion from step a) with a persulfate initiator, and methacrylic acid monomers or styrene monomers or styrene monomers together with a second ethylenically unsaturated monomer, and carrying out a free radical polymerization of the monomers to form an outer shell of poly(methacrylic acid), styrene polymer or styrene copolymer around the inner shell with sulfate ($SO_4$) bounded to the outer shell, so that functionalized magnetizable microspheres are formed.

10. The method of claim 9, wherein the persulfate initiator is an alkali metal persulfate.

11. The method of claim 10, further comprising a step in which the functionalized magnetizable microspheres obtained from step b) are allowed to contact with an aqueous solution that contains ions of a noble metal, reducing the ions of the noble metal to elemental form thereof, so that the noble metal is deposited onto the surface of the outer shell.

12. The method of claim 9, wherein the first ethylenically unsaturated monomer is not used in step a).

13. The method of claim 12, wherein the styrene polymer obtained in step a) has a number average molecular weight between 1000-1000000.

14. The method of claim 9, wherein the second ethylenically unsaturated monomer is not used in step b).

15. The method of claim 14, wherein the styrene polymer obtained in step b) has a number average molecular weight between 1000-1000000.

16. The method of claim 11, wherein the noble metal is selected from the group consisting of gold (Au), silver (Ag), palladium (Pd), platinum (Pt), and ruthenium (Ru).

17. The method of claim 11, wherein the contact between the functionalized magnetizable microspheres and the aqueous solution is carried out at a temperature ranging between 50-95° C.

18. The method of claim 9, wherein the first ethylenically unsaturated monomer and the second ethylenically unsaturated monomer independently are acrylic acid, methacrylic acid, methyl acrylate, or methyl methacrylate.

19. The method of claim 9, wherein the magnetizable nano particles are magnetite or haematite.

20. The method of claim 9, wherein the non-water-soluble dispersing agent is an aliphatic acid or an aliphatic amine having 12-24 carbon atoms.

* * * * *